United States Patent

[11] 3,633,338

[72] Inventor Carl W. Zahn
Bartlesville, Okla.
[21] Appl. No. 17,082
[22] Filed Mar. 6, 1970
[45] Patented Jan. 11, 1972
[73] Assignee Phillips Petroleum Company

[54] GAS METHOD AND APPARATUS FOR DRYING
6 Claims, 1 Drawing Fig.

[52] U.S. Cl.................................................. 55/31,
55/268, 260/676 H
[51] Int. Cl....................................................B01d 53/00,
C07c 9/02
[50] Field of Search.......................................... 55/29–33,
171–177, 267, 268, 46, 48, 51; 260/676 H

[56] References Cited
UNITED STATES PATENTS

| | | | |
|---|---|---|---|
| 3,531,915 | 10/1970 | Nagel et al.................... | 55/32 |
| 3,401,502 | 9/1968 | Hailer et al. .................. | 55/48 |
| 3,096,383 | 7/1963 | Hahn............................ | 260/676 H |

Primary Examiner—Reuben Friedman
Assistant Examiner—Charles N. Hart
Attorney—Young & Quigg ABSTRACT: An improved method and apparatus for drying a gas stream by stagewise injecting and removing streams of drying agents into and from said gas stream. The drying agent streams flow generally concurrently relative to the flow direction of the gas stream for relatively contacting the dryest portion of the gas with the dryest portion of the drying agent stream.

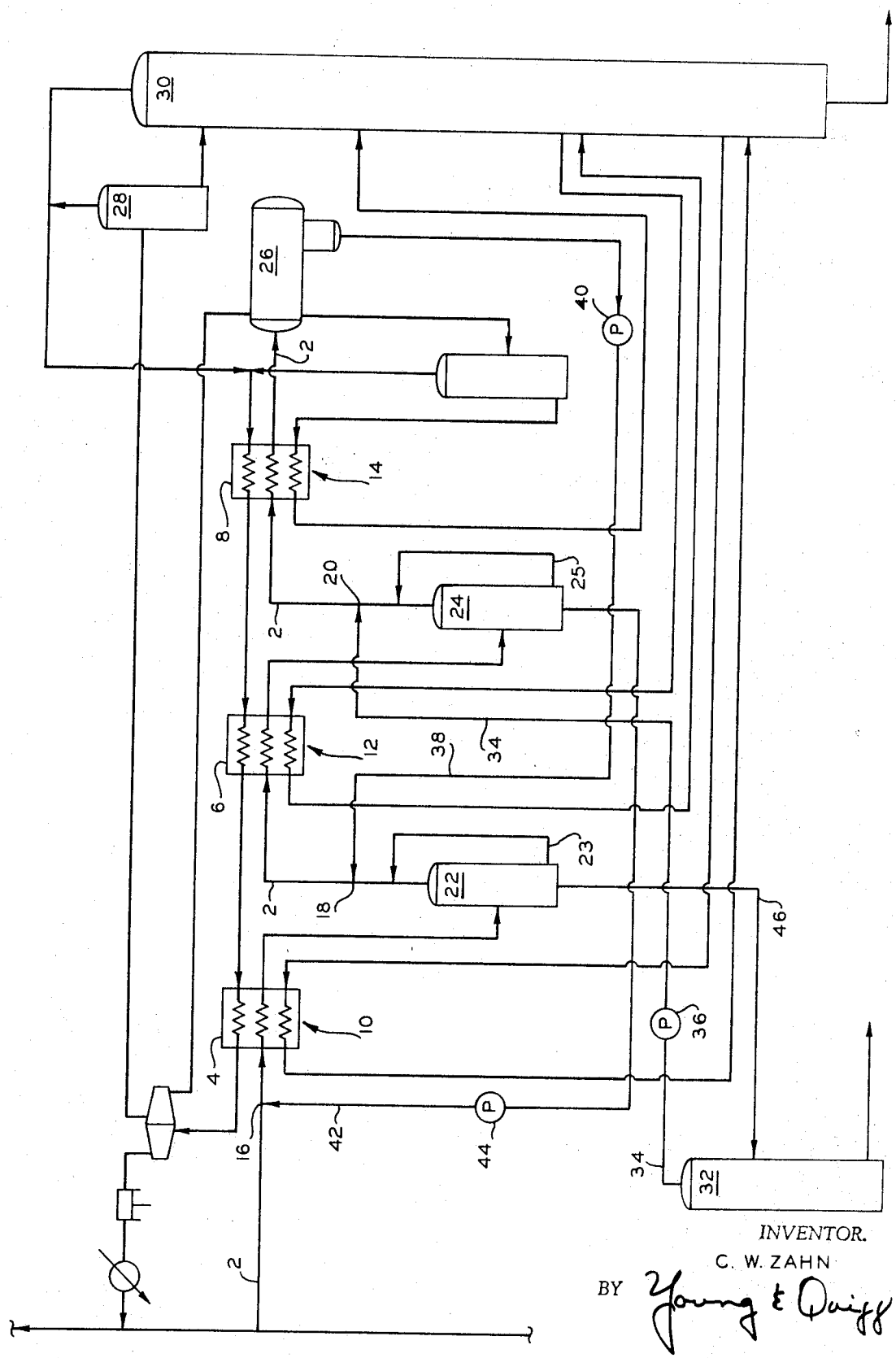

GAS METHOD AND APPARATUS FOR DRYING

This invention resides in an improved method and apparatus for drying a moisture-containing gas stream. In another aspect, this invention resides in an improved method and apparatus for injecting a dehydrating agent into a moisture-containing gas stream for removal of the moisture from the gas stream.

Heretofore, moisture-containing gas streams were generally dried by injecting a drying or dehydrating liquid agent, such as methanol for example, into the gas stream at one location and removing the agent and moisture from the gas stream at another location. This heretofore-utilized gas drying method required relatively low moisture content dehydrating agent, hereafter referred to as methanol, and did not flow sufficient liquid reagent through the nozzles to afford proper dispersion of the reagent into the gas. An improved method and apparatus has been discovered by which a gas stream can be effectively dried with the stagewise utilization of reagents of different water content at different temperature levels.

It is, therefore, an object of this invention to provide an improved method and apparatus for drying a moisture-containing gas stream. Another object of this invention is to provide an improved method and apparatus for injecting methanol into a moisture-containing gas for removing the moisture from said gas stream. Yet another object of this invention is to provide an improved method and apparatus for preventing solid gas hydrate and ice formation in a moisture-containing gas stream by removing moisture from said gas stream.

Other aspects, objects, and advantages of the present invention will become apparent from the disclosure, the appended claims and the drawing.

The drawing is a diagrammatic view of a portion of a typical natural gas liquids recovery plant. The drawing shows a gas stream, a plurality of gas-stream temperature-lowering zones, and associated equipment for preventing hydrate and ice formation in the gas stream.

Referring to the drawing, a moisture-containing gas stream 2 flows through first, second and third heat exchangers 4,6,8 with each heat exchanger and associated gas stream forming a separate, individual gas temperature lowering zone 10,12,14. A separate drying agent injection location 16,18,20 on the gas stream 2 is formed immediately upstream of each temperature lowering zone 10,12,14 for injecting methanol into the gas stream 2. Separate equipment, such as first, second and third separators 22,24,26 are each positioned in the gas stream 2 immediately downstream of their respective temperature lowering zones 10,12,14 for removing a stream of methanol-containing fluid from the gas stream 2.

At each temperature lowering zone 10,12,14, the temperature of the gas stream 2 is progressively lowered to a different preselected temperature. At each separator 22,24,26 additional moisture is removed from the gas stream, resulting in the gas stream becoming progressively dryer as said gas stream flows past the temperature lowering zone 10,12,14, the intervening separators 22,24,26 or moisture knockouts, and, for example, into an associated gas-liquid separator 28 and a demethanizer 30 and to other processing and storage equipment.

The methanol-containing fluid is progressively passed through a drying vessel 32 for removal of water from the wet methanol by heating the fluid in a fractionation column for example. In order to provide a method that can efficiently remove water from a relatively dry gas, it is preferred that a stream of substantially dry methanol 34 discharging from the drying vessel for injection into the gas stream 2 be comprised of at least 95 percent methanol.

The dry methanol stream 34 passes through an associated pump 36 where the pressure of the liquid methanol stream is increased and said stream is injected into the gas stream 2 immediately upstream of the last temperature lowering zone, for example as shown in the drawing, at the third injection location 20 upstream of the third temperature lowering zone 14. A stream of methanol-containing fluid 38 is removed from the gas stream from a location immediately downstream of test temperature lowering zone, for example as shown in the drawing, from the third separator 26 downstream of the third temperature lowering zone 14. That methanol-containing fluid stream is thereafter consecutively passed into the gas stream at a location upstream of each temperature lowering zone 12,10 and removed from a location immediately downstream of the respective temperature lowering zone. By so stagewise or intermittently injecting the methanol-containing fluid stream into the gas stream and consecutively moving the methanol-containing fluid stream to injection locations located in an order generally countercurrent to the flow direction of the gas stream being treated, i.e., order of consecutive locations being 20,18,16, respectively, each methanol fluid injected stream progressively contains a larger volume of moisture and the gas stream into which injected has a progressively higher temperature.

Referring to the drawing, the methanol-containing fluid stream 38 passes through its associated pump 40 and is injected into the gas stream 2 at the second location 18, removed as methanol-containing fluid stream 42 from the second separator 24, passes through its associated pump 44, is injected into the gas stream 2 at the first location 16, removed as methanol-containing fluid stream 46 from the first separator 22 and is thereafter passed to the drying vessel 32, for example, for reconditioning and the removal of a water stream therefrom.

By so constructing the gas treating equipment, the portion of the gas stream containing the least amount of moisture is always contacted with and treated by a methanol-containing fluid stream that comprises the least amount of water, therefore being the most efficient fluid available in the process for removing water and preventing ice and solid gas hydrate formation in the gas as the temperature of the gas is progressively lowered.

Referring again to the drawing, conduits 23 and 25, respectively, pass a portion of the liquid reagent from separators 22 and 24, respectively, into the separated gas streams from the separators 22 and 24, respectively, without additional pump requirements, to afford sufficient liquid reagent, in addition to the reagents added by way of conduits 38 and 34, respectively, so that proper dispersion of the liquid reagents into the gas streams can be effected. These flow afford recycle contact of the reagents and the gases.

Owing to the fact that the temperature of the gas stream is being lowered, the apparatus is constructed relative to the composition of the incoming gas and of the injected inhibitor so that the lowest temperature of each temperature lowering zone is higher than the temperature at which the methanol-containing fluid stream freezes. Knowing the percentage of moisture in the incoming gas, one skilled in the art can easily regulate the gas temperature as it passes through the plurality of temperature lowering zone so that the injected methanol-containing fluid streams do not freeze.

It should be understood that more or less temperature lowering zones and methanol injection locations can be utilized for preventing ice and hydrate formation by the improved method of this invention and that dehydrating agents other than methanol can be utilized. By so staging methanol treatment and maintaining a moisture content relative between the methanol streams and the gas streams, the gas can be dried more effectively than by prior art methods.

Typical example utilizing the apparatus shown in the drawing is as follows:

EXAMPLE

Wet Gas 2:

| | |
|---|---|
| Flow Rate, MMSCF/Day[1] | 100 |
| Temperature, °F. | 70 |
| Pressure, p.s.i.a. | 575 |
| Composition, mol % | |
| Nitrogen, $CO_2$, etc. | 5 |
| Methane | 85 |
| Ethane plus | 10 |
| Water, No./MMSCF | 70 |

Methanol Inhibitor 34:

| | |
|---|---|
| Pounds/Day | 9642[2] |
| Volume percent Methanol, % | 95 |
| Freezing point, °F. | about −165 |

Separator 26:

| | |
|---|---|
| Pressure, p.s.i.a. | 545 |
| Temperature, °F. | −100 |
| Water in Dry Gas, p.p.m.[3] | 0.3 |
| Methanol in Dry Gas, p.p.m. | 4 |

Methanol Inhibitor 38:

| | |
|---|---|
| Pounds/Day | 9783 |
| Volume Percent Methanol, % | 94 |
| Freezing Point, °F. | −170 |

Separator 24:

| | |
|---|---|
| Pressure, p.s.i.a. | 555 |
| Temperature, °F. | −63 |

Methanol Inhibitor 42:

| | |
|---|---|
| Pounds/Day | 14,123 |
| Volume Percent Methanol, % | 65 |
| Freezing Point, °F. | −92 |

Separator 22:

| | |
|---|---|
| Pressure, p.s.i.a. | 565 |
| Temperature, °F. | 8 |

Methanol Inhibitor 46:

| | |
|---|---|
| Pounds/Day | 16,623 |
| Volume Percent Methanol, % | 55 |
| Freezing Point, °F. | −58 |

Moisture Content of Gas:
No./MMSCF:

| | |
|---|---|
| Gas Stream 2 | 7 |
| Gas Stream from Overhead of 22 | 4.5 |
| Gas Stream from Overhead of 24 | 0.16 |

Note: Eutectic for methanol-water is −200° F. at 88 % by volume methanol.

[1] MMSCF is Million Std. Cu. Ft. per Day

[2] Plus amount equal to losses

[3] p.p.m. is parts per million by weight

Other modifications and alterations of this invention will become apparent to those skilled in the art from the foregoing discussion and accompanying drawing, and it should be understood that this invention is not to be unduly limited thereto.

What is claimed is:

1. A method for preventing hydrate and ice formation in a moisture-containing gas stream, said gas stream having its temperature progressively lowered to a plurality of different preselected values at a plurality of temperature lowering zones and the moisture of said gas stream removed by mixing a dehydrating agent with the gas stream and thereafter removing the agent-containing fluid and moisture from the gas stream, said agent-containing stream being passed through a drying vessel for the removal of water therefrom, the improvement comprising:

passing a stream of dehydrating agent from the drying vessel into the gas stream at an injection location immediately upstream of the last temperature lowering zone;

lowering the temperature of the gas stream having the dehydrating agent contained therein;

removing a stream of agent-containing fluid from the gas stream at a separating location immediately downstream of the last temperature lowering zone;

consecutively passing the agent-containing fluid stream into the gas stream upstream of each temperature lowering zone, lowering the temperature of the gas stream having the dehydrating agent therein at each temperature lowering zone, and removing an agent-containing fluid from the gas stream at a separating location immediately downstream of each respective temperature lowering zone, said agent-containing fluid stream being injected into the gas stream at injection locations at which the gas stream is of a progressively higher temperature and contains a greater volume of water and said agent-containing fluid stream discharging from each separating location being passed directly from the separating location into the gas stream; and passing the agent containing fluid removed from downstream of the first temperature lowering zone to the drying vessel.

2. A method, as set forth in claim 1, wherein the dehydrating agent is methanol.

3. A method, as set forth in claim 1, wherein the agent-containing fluid stream discharging from the drying vessel and being injected upstream of the last temperature lowering zone comprises at least 95 percent methanol by volume.

4. A method, as set forth in claim 1, wherein the temperature of the gas stream at each agent-containing fluid stream injection location is higher than the temperature at which the agent-containing fluid stream freezes at the pressure of said gas stream.

5. A method, as set forth in claim 1, wherein the gas stream downstream of each temperature lowering zone is passed through a separate individual separator, each for separating an agent-containing fluid stream from said gas stream.

6. An apparatus associated with a moisture-containing gas stream, said gas stream having its temperature progressively lowered to a plurality of different preselected values at a plurality of temperature lowering zones, comprising:

a plurality of gas-liquid separators, each positioned in the gas stream at a different separate location downstream of each temperature lowering zone, said gas-liquid separators having an outlet for removing a dehydrating agent-containing fluid stream from the gas stream;

a separate conduit connected at one end to the outlet of a separator that is downstream from at least three temperature lowering zones and connected at the other end to the gas stream at a location between a separator and the second temperature lowering zone upstream from the respective separator of the conduit for passing a dehydrating agent-containing fluid stream from its associated separator upstream relative to the gas stream and injecting said fluid into the gas stream;

a drying vessel having a dehydrating agent stream outlet and being connected to the outlet of a separator that is located downstream from only one temperature lowering zone;

a conduit connected to the outlet of the drying vessel and the gas stream at a location between the most downstream temperature lowering zone and said temperature lowering zone associated with the separator located upstream thereof for passing the agent stream from the drying vessel into the gas stream; and pumping means for moving the agent stream along its cyclic pathway.

* * * * *